Figure 1:
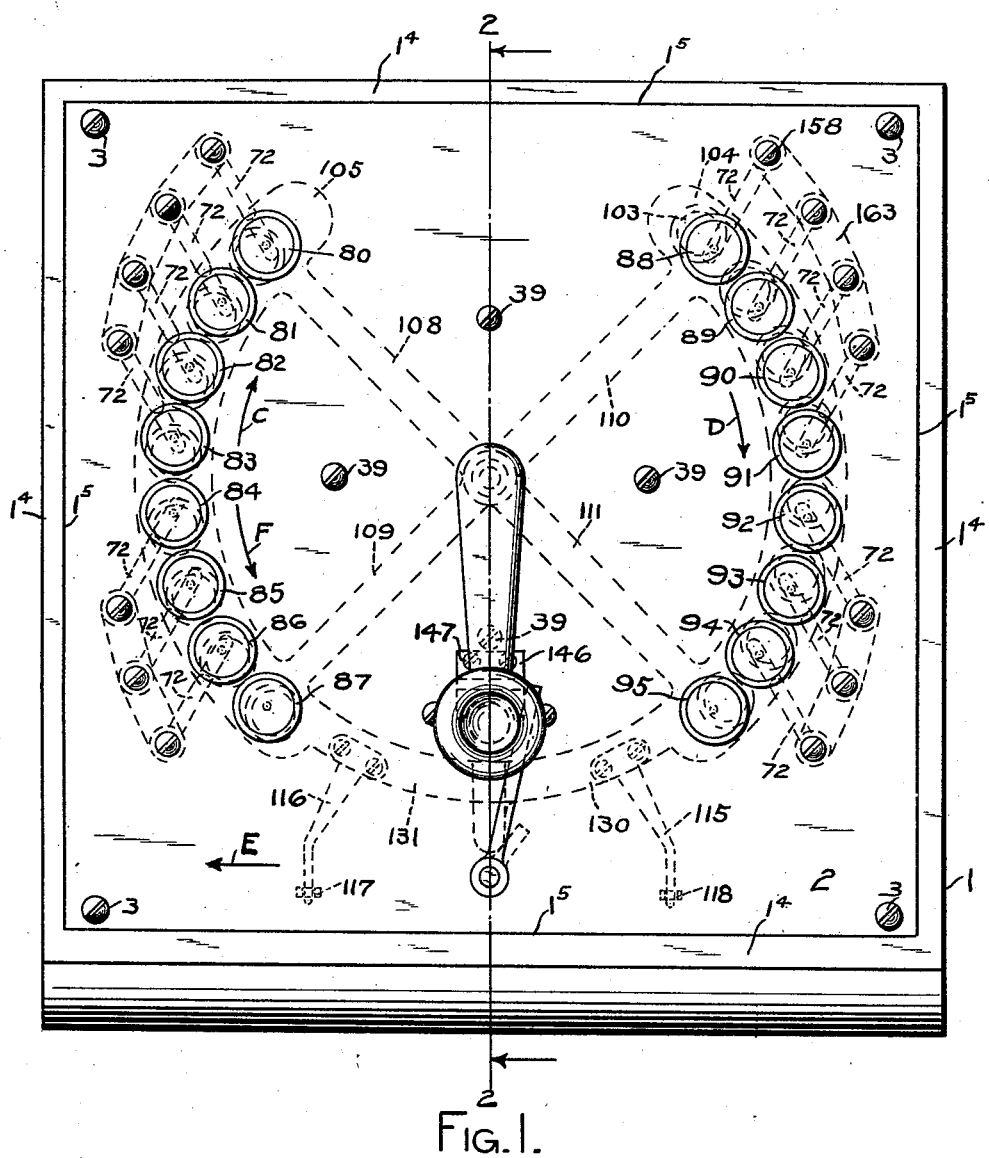

M. F. GEER & R. C. LEAKE.
SELECTIVE CALLING KEY.
APPLICATION FILED DEC. 22, 1910.

1,076,278.

Patented Oct. 21, 1913.
5 SHEETS—SHEET 1.

WITNESSES:
George T. Whitney
Henrietta Vosburgh

Maurice F. Geer
Richard C. Leake
INVENTORS.
BY Lyman E. Dodge
ATTORNEY.

M. F. GEER & R. C. LEAKE.
SELECTIVE CALLING KEY.
APPLICATION FILED DEC. 22, 1910.
1,076,278.
Patented Oct. 21, 1913.
5 SHEETS—SHEET 3.
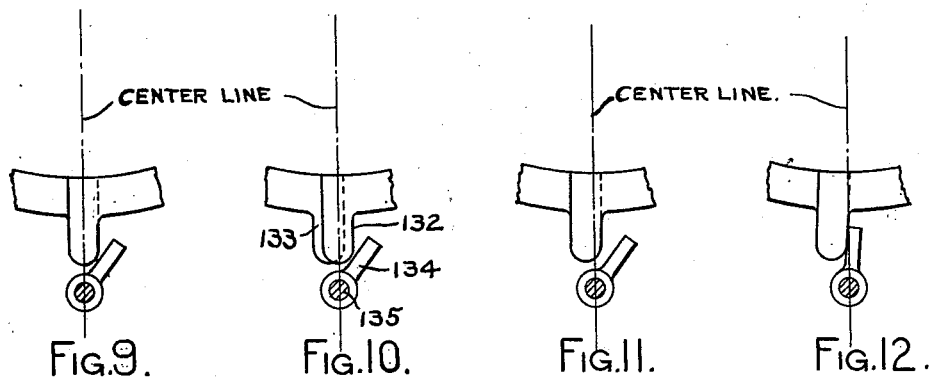
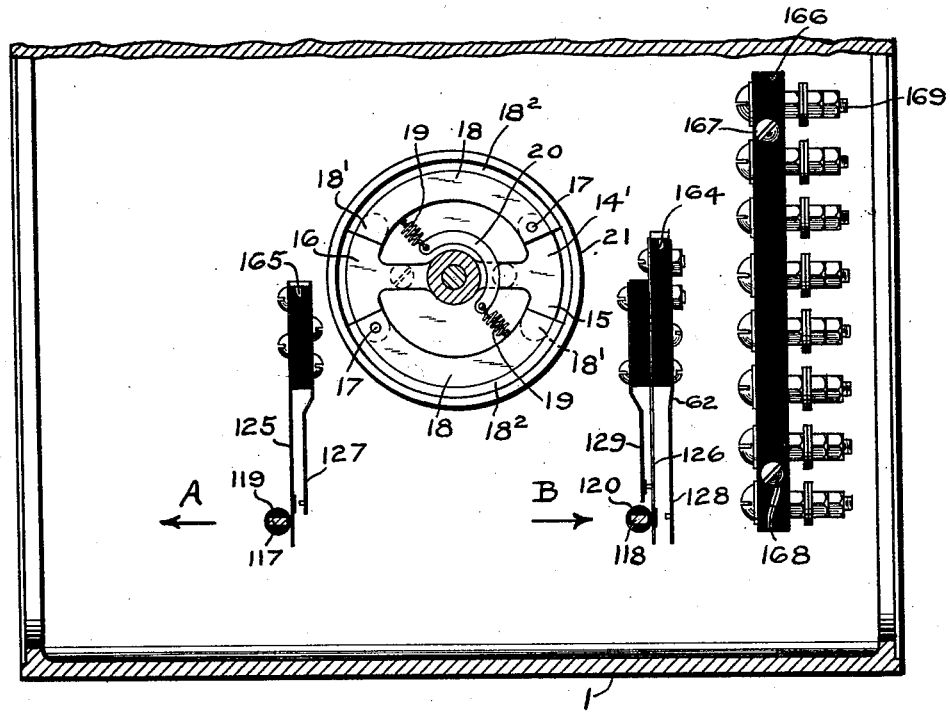
FIG. 3.
Maurice F. Geer
Richard C. Leake
INVENTORS.
WITNESSES:
George T. Whitney
Henrietta Vosburgh
BY Lyman E. Dodge
ATTORNEY.

M. F. GEER & R. C. LEAKE.
SELECTIVE CALLING KEY.
APPLICATION FILED DEC. 22, 1910.

1,076,278.

Patented Oct. 21, 1913.
5 SHEETS—SHEET 4.

UNITED STATES PATENT OFFICE.

MAURICE F. GEER AND RICHARD C. LEAKE, OF ROCHESTER, NEW YORK, ASSIGNORS TO GENERAL RAILWAY SIGNAL COMPANY, OF GATES, NEW YORK, A CORPORATION OF NEW YORK.

SELECTIVE CALLING-KEY.

1,076,278. Specification of Letters Patent. Patented Oct. 21, 1913.

Application filed December 22, 1910. Serial No. 598,673.

*To all whom it may concern:*

Be it known that we, MAURICE F. GEER and RICHARD C. LEAKE, citizens of the United States, and residents of the city of Rochester, in the county of Monroe and State of New York, have invented a new and useful Selective Calling-Key, of which the following is a specification.

This invention relates to that class of devices whereby a varying number of impulses of electricity of opposite polarity may be impressed upon line wires to operate selectively upon appropriately constructed devices at remote stations.

The devices to which this invention relates are in the electrical art termed selective calling keys, and this invention therefore broadly relates to a selective calling key.

The primary object of the invention is to construct a device of the character described that will enable an operator at a central station to call any one of a large number of remote stations by as few and simple operations as is consistent with the complexity of a selective calling system.

A further object of the invention is to so construct a selecting transmitting key that the mental task required of an operator in performing the operations necessary to call a remote station is slight, the construction of the transmitting key being such that the necessity for the so called "code call" is entirely eliminated, substituting therefor simple operations, such as the pressing of only two buttons once each and the turning of a crank.

A further object of the invention is to so construct a device of the character stated that undue haste in transmitting the impulses of electricity to the lines by the operator, thereby causing faulty operations of the devices at the remote stations is entirely prevented by means inherent in the mechanism.

A further object of the invention is to so construct a device of the character stated that all parts will automatically return to their normal positions ready for another calling operation, after one call has been made.

A further object of the invention is to so construct a device of the character stated that one kind of current may be impressed upon line wires for operating the selective devices at remote stations and another kind of current may be impressed upon line wires for operating an audible alarm at remote stations after the selector device at that station has itself been operated.

A further object of the invention is to provide means independent of the will of the operator to prolong the audible alarm at the remote stations for such a time as is deemed best in order that attention will surely be attracted.

A further object of the invention is to assemble in a unitary structure, occupying but small space and comprised of but relatively few parts, all of the mechanisms for accomplishing the above named objects.

A further object of the invention is to construct the device for accomplishing the above named objects in a substantial and durable manner, and to so connect the various parts of the assembled key that it may be readily taken apart for the purposes of inspection or repair, and when so taken apart that all of its parts shall be readily accessible.

The invention consists in the constructions, combinations and arrangements herein shown, described and claimed.

Figure 2:
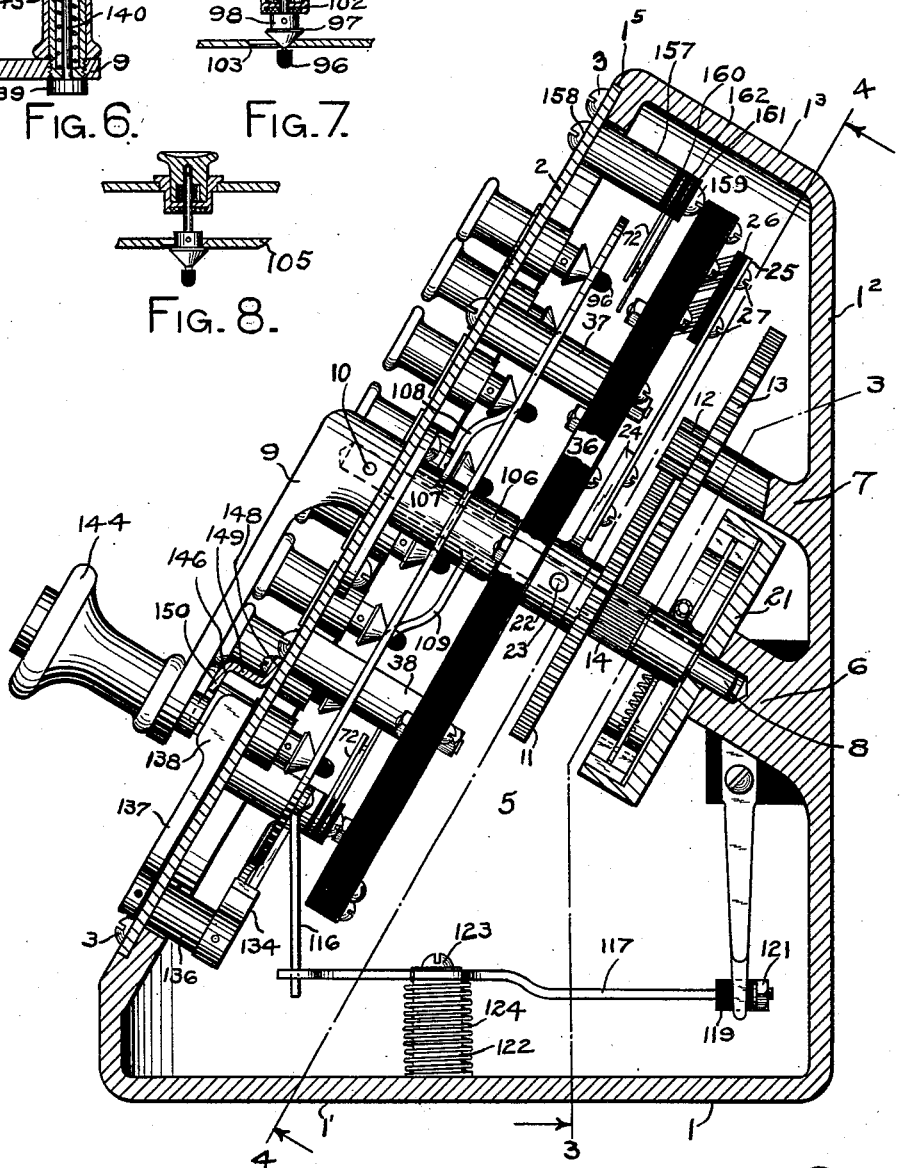
Figure 4:
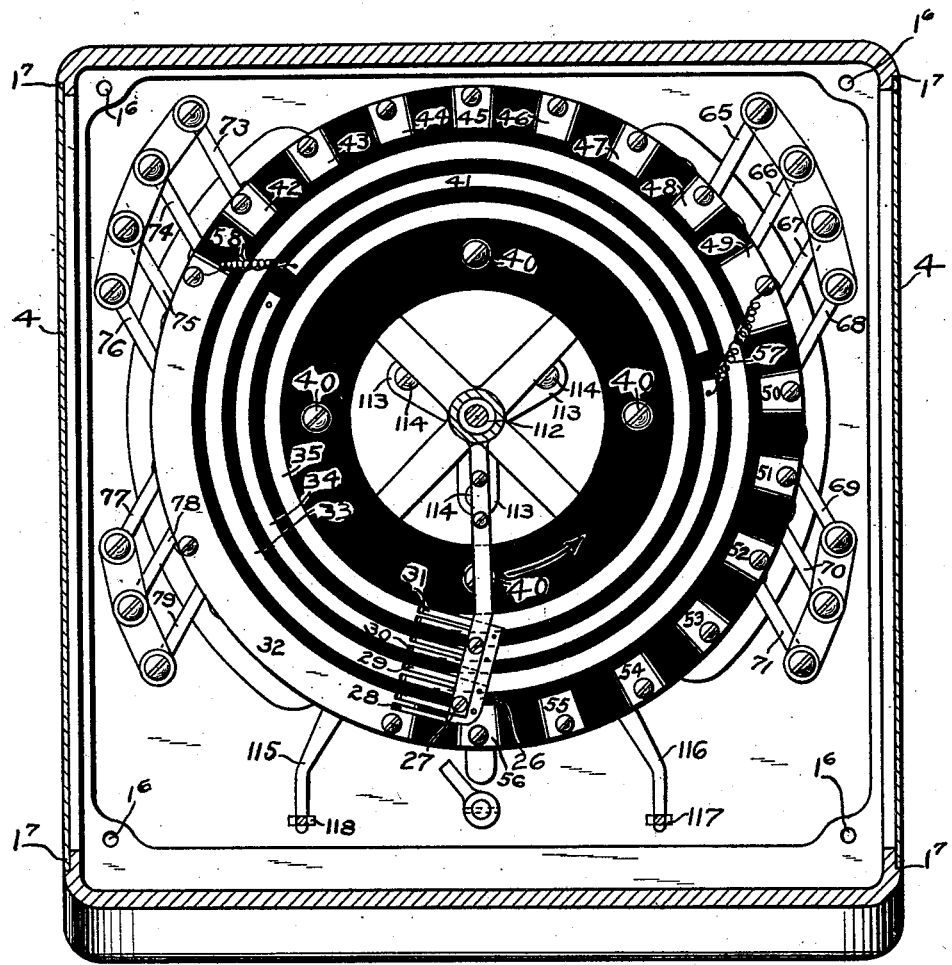
Figure 5:
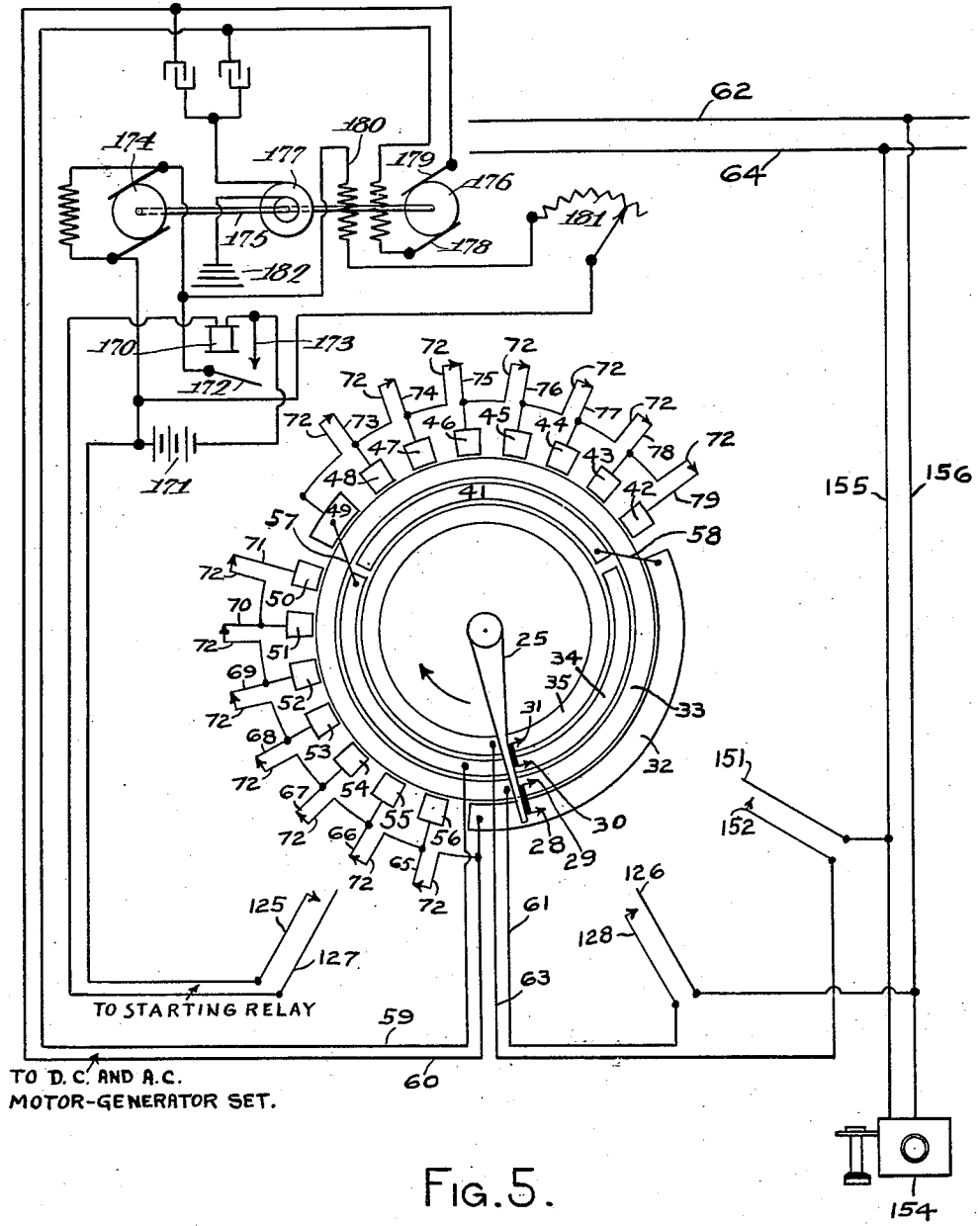

In describing the invention in detail reference will be had to figures of the drawings and the characters of reference thereon, in which:

Figure 1 is a top view looking in a direction at right angles to the face of the key. Fig. 2 is a cross sectional view on the line 2—2 of Fig. 1 looking in the direction of the arrows. Fig. 3 is a longitudinal sectional view on the line 3—3 of Fig. 2 looking in the direction of the arrow. Fig. 4 is a longitudinal sectional view on the line 4—4 of Fig. 2 looking in the direction of the arrow. Fig. 5 is a diagrammatic view illustrating the circuits controlled by the key. Fig. 6 is a cross section showing the construction of a crank handle used in the device. Fig. 7 is a view partly in section of a push key used in the device shown in normal position. Fig. 8 is a view showing the parts as illustrated by Fig. 7 in another position. Figs. 9, 10, 11 and 12 are detailed views showing the different relative positions of tongues on the sectors forming a part of the device.

*Construction.*—1 designates a cast metal frame forming the supporting structure for the operating parts, and is composed of the base 1¹ which may be screwed to a support such as a table, the back 1², the slanting top 1³ and the rim 1⁴, having the shoulders 1⁵ forming the bounding lines of a rectangular space in which is fitted the face plate 2. The face plate 2 which is fastened to the frame 1 by means of the screws 3, screwed into holes 1⁶ and the side pieces 4 fitting between the shoulders 1⁷ formed on base 1 which may be fastened to the frame 1 in any appropriate manner form together with the frame space 5 in which those parts which it is desired to protect from outside interference may be inclosed.

6 and 7 designate bearings cast integral with the frame; 8 designates a shaft one end of which extends through the face plate 2 and bears a crank 9 which is pinned thereto by means of pin 10, the other end of which shaft is journaled in bearing 6; 11 designates a gear wheel rigidly attached to shaft 8 and meshing with a pinion 12, which is rigidly attached to the gear 13, both of which revolve upon a stud fastened in bearing 7; 14 designates a pinion revolubly mounted upon shaft 8 and having rigidly attached thereto friction shoe bearing member 14¹ which has two arms 15 and 16 to each of which is attached by means of pins 17 the brake shoes 18—18. The ends of the brake shoes 18—18 not attached by means of the pins 17 are held inwardly by means of the tension springs 19, one end of each spring being attached to members 18, the other ends of the springs being attached to the opposite ends of a curved intermediate member 20, the brake shoes 18—18 having slotted ends 18¹ in which the arms 15 and 16 are inserted to hold the brake shoes in position; 18² designates fiber pieces fastened to the brake shoes to increase their adhesion to the brake drum 21; which is rigidly attached to the bearing 6.

22 designates a hub pinned by means of pin 23 to shaft 8 and bearing an outstanding arm 24, to which is attached the extension arm 25 bearing the insulating block 26, fastened thereto by means of the screws 27, which block bears the contact springs 28, 29, 30 and 31, each spring comprising two fingers which bear upon the metallic strips 32, 33, 34 and 35 fastened to the back face of an insulating disk 36 best shown in Fig. 4; 37 and 38 are spacing and supporting members to space the disk 36 from the face plate and to support the same, the spacing posts being fastened to the face of the plate by the screws 39 and the disk being fastened to the posts by the screws 40 best shown in Fig. 4. To the back face of the disk are also attached by means of screws the curved strip 41 and the small segmental strips 42, 43, 44, 45, 46, 47, 48, 49, 50, 51, 52, 53, 54, 55 and 56; 57 designates a wire connecting strip 49 with strip 34; 58 designates a wire connecting strip 32 with strip 41.

59 designates a wire connected to the strip 34 at one end and to one pole of a source of direct current at the other; 60 designates a wire one end of which is connected to strip 32 and the other end of which is connected to the other pole of the same source of direct current; 59 and 60 both being connected to one pole of a source of alternating current; 61 designates a wire connected to strip 33 at one end and contact spring 128 at the other; 63 designates a wire connected at one end to strip 35 and at the other to a contact spring 152; 65, 66, 67, 68, 69, 70 and 71 designate contact springs each of which is normally in contact with a shorter contact spring as 72 shown in Fig. 2, all of these springs 65, 66, &c., and the co-acting springs 72 being held in place by means of a post 157 fastened to the face plate by means of the screw 158, the springs being held in place thereon by screw 159 and which has an insulating bushing about it, not shown, being insulated from the post 157 and from each other by means of insulating washers 160, 161 and 162. Each of the lower springs as 65 is connected to the adjacent upper spring as 72 as best shown in Fig. 5 by ribbon copper 163. On the other side of the device a similar set of springs is arranged, the upper springs being designated 72 and the lower springs being designated 73, 74, 75, 65, 77, 78 and 79 respectively.

Each of the lower springs in both sets are adapted to contact with and be moved out of engagement with the top springs 72 by means of the push keys 80, 81, 82, 83, 84, 85, 86, 87, 88, 89, 90, 91, 92, 93, 94, 95; 96 designates an insulating bone tip on the end of each push key, which is adapted to contact with the lower contact springs before mentioned. Just above the insulating bone tip 96 on the same spindle 99 therewith is a cone shaped member 97 having a shoulder 98 at the base of the cone; 100 designates a knob fastened to the top of spindle 99 which is slidingly mounted within the cavity 101 of the cup shaped member 102 which is pressed into the face plate 2; 170 designates a compression spring placed between the knob 100 and the bottom of the cup shaped member 102, so that the knob is normally held upwardly, which, of course, also holds up the cone shaped member 97. Each of the cone shaped members 97 rests within the counter sunk holes 103 of the sectors 104 and 105.

106 and 107 designate hubs which bear the arms 108, 109, 110, 111 which support the sectors 104 and 105. These hubs are journaled on a bushing 112 best shown in Fig. 4, which is rigidly attached to the face plate 2 by means of the three arms 113 and the screws 114, the hub encircling the shaft 8 and forming a bearing for the same; 115 and 116 designate arms best shown in Fig. 1, which depend from the sectors 104 and 105 respectively, and which pass through the bifurcated ends of levers 117 and 118, which levers bear upon their other end the insulating sleeves 119 and 120 best shown in Fig. 3, which are held in place upon the levers by means of the screw threaded ends and the nuts 121 as shown in Fig. 2, the levers being pivoted on the posts 122 and held in place thereon by means of the screws 123 and having a constant tension exerted upon them to force them in the direction of the arrow A in Fig. 3 caused by springs 124. The insulating sleeves 119 bear against contact springs 125 and 126 and cause spring 125 to contact with spring 127 when moved in the direction of the arrow B when the arm 117 is caused to move by depressing one of the push keys as 80 on the left hand side of the face of the transmitting key. The spring 126 being also made to contact with spring 128 when the lever 118 is moved in the direction of the arrow B by the operation of one of the push keys as on the right hand side of the face of the device. Back of springs 126 and 128 as shown in Fig. 3, are a similar set of springs 151 and 152 all of which together with springs 126 and 128 are mounted on a block of insulating material as 164, which is fastened to the back 1² of the frame. The springs 125 and 127 being likewise mounted on insulating block 165 fastened to the back 1² of the frame.

The cone shaped members 97 resting within the counter sunk holes of the sectors 104 and 105 and bearing against one edge of the holes 103 therethrough will, upon being depressed, cause the sectors 104 and 105 to rotate about the bushing 112, the keys on the left hand side of the front of the device causing the sector 105 to rotate in the direction of the arrow C Fig. 1, and the push keys on the right hand side of the device causing a movement of the sector 104 in the direction of the arrow D, Fig. 1, and as both of the arms 115 and 116 are connected to the respective sectors 104 and 105 the arms 115 and 116 will be caused to move in the direction of the arrow E Fig. 1.

Each sector 104 and 105 has at its lower end an extension 130 and 131 respectively, which extensions overlap, as best shown in Fig. 10, and have each a depending finger as 132 and 133, both of which are in the path of a lever 134 pinned to a shaft 135, which passes through and is journaled in a bearing 136 and which shaft 135 bears on its other end on the front face of the device the lever 137 which has an enlarged upper end as 138, which lies in the path of a disk 139 borne on the end of a spindle 140, the upper end of which bears the thumb piece 141 which is held in its upper position by means of the spring 142 pressing against the thumb piece 141 and the bottom of a hollow member 143, which is screwed into the end of the arm 9 and which passes through the handle 144 and binds the handle to the arm 9 by means of a shoulder 145. The disk 139 is also adapted in its upper position to contact with and thereby be held in place so that the crank 9 cannot be moved by means of the stop 146 fastened to the face plate 2 by means of the screws 147. The stop 146 having a foot 148 which rests on the face plate 2 and having a right angled extension 149 which is perpendicular to the face plate 2, and which bears on its upper end the right angled extension 150 which has its outer edge formed in the arc of a circle struck from the center of the spindle 140.

The fingers 132 and 133 on the sectors 104 and 105 normally lie one in front of the other being bent as shown in Fig. 2 in order that they may thus do so; 166 designates a block of insulating material fastened to the back 1² by means of screws 167 and 168 and bearing binding posts 169 to which the different wires running to the key are connected, being passed up through a hole not shown in the base 1¹; 154 designates a telephone permanently connected with line wires 62 and 64.

The connections from the key to the source of current are indicated in Fig. 5; therein is shown the two springs 125 and 127 as connected with a starting relay 170 in series with a source of current 171. When contact is made between the springs 125 and 127 the relay 170 is energized causing the armature 172 to be raised in contact with point 173, so that a circuit is then formed including the source of current 171 through the shunt wound motor 174. The shaft 175 of this motor also carries the armature winding to which the collector rings 177 and brushes 178 and 179 are connected. A rotation of the armature of motor 174 causes the generation of both direct and alternating current, the one of which is derived from brushes 178 and 179 and the other of which is derived from collector rings 177. The generator of which 176 is the armature has a shunt field 180 which is in series with an adjustable resistance 181, the source of current 171 and the armature 172 of the starting relay 170. The generator also has a series field to one terminal of which wire 59 is connected, the other terminal of the field being connected to brush 178 and the other brush 179 being connected with wire 60. The brushes bearing upon the collector rings are connected one through condensers to both wires 59 and 60, the other to a ground at 182.

The connecting wires between spring 65 and contact 56; between spring 66 and contact 55, etc.; in Fig. 4, have not been shown as such showing would merely tend to confuse, but in the diagrammatic view Fig. 5 such connections are shown.

*Operation.*—If an operator at the central station desires to call any one of a number of remote stations at each of which is a selecting device bridged across the line wires 62 and 64, assuming the combination of the station which it is desired to call is 3—5, the operator at the central station would first push in the push key 82, by so doing he would compress the spring 170 and force the cone shaped member 97 against the edge of the hole in the sector 105, causing the sector to move in the direction of the arrow C in Fig. 1 about the hub 112, which sector having arm 116 rigidly attached thereto would cause a movement of lever 117 so as to make a contact between springs 125 and 127, which contact being connected in series with a source of current and a relay, the relay would thereby be energized and cause a local circuit to be formed and cause the generators of direct current and alternating current to be put in motion and impress a direct current difference of potential on the wires 59 and 60, and also impress an alternating current electromotive force upon both wires of equal potential; as fully shown, described and claimed in applicants' co-pending application Serial No. 600,083, filed December 30th, 1911. By the depression of the key 82 before mentioned, the contact between springs 67 and 72 would be broken. When the key was depressed the sector 105 rotated the finger 133 so that it would be in the position as shown in Fig. 10, and would assume such position by virtue of the fact that the shoulder on the cone shaped member would pass the edge of the hole in the sector 105 and the sector would then be thrown by the action of the spring 124 into the position shown in Fig. 8, thereby catching and holding the key from returning under the action of the spring 170. The operator would next depress the key 92, causing in the same manner sector 104 to rotate in the direction of the arrow D carrying with it the arm 115, which acting upon lever 118 would cause spring 126 to engage with spring 128 and also cause spring 151 to make contact with contact spring 152 thus connecting the wires 61 and 63 with the line. As soon as the relay above mentioned makes contact and starts the direct current and alternating current generators assuming that wire 60 is connected with the positive side of the direct current generator, current would flow through the wire 60 to the metal strip 32, then by means of the brushes 28 and 29 it would pass to strip 33 and by means of the wire 61, spring 128, spring 126 and wire 156, it would pass to the line wire 62, traveling through the line wire to all of the selector stations through the selecting devices to the other line wire 64, from wire 64 by means of wire 155, spring 151, contact spring 152, wire 63, strip 35, springs 31 and 30 to strip 34, passing from strip 34 by means of the wire 59 to the negative side of the generator. The current above traced would cause one step of the selecting device. If the operator now depresses the disk 139 and thus frees it from the stop 146 by turning crank 9 in a clock-wise direction he will cause springs 28 and 29 to pass from the metallic strip 32 to the space between strip 32 and 56 thereby breaking the above traced circuit, which will allow the actuating dogs of the selectors at the remote stations to return to normal position. Continued movement of the arm 9 would, however, cause springs 28 and 29 to contact with strips 56 and 33, thereby allowing the current from the positive side of the generator to pass by means of wire 60 to contact spring 72, spring 65, strip 56, brush 28, brush 29, strip 33 to wire 61, contact springs 128 and 126 and wire 156 to line wire 62, thence through the selectors at the different stations returning by means of the line wire 64, wire 155, spring 151, contact spring 152 and wire 63 to strip 35 and by means of springs 31 and 30 to strip 34, and by means of wire 59 to the other side of the source of current, thereby causing another movement of the selectors at the different stations. Further movement of the arm 9 would again cause the current to be broken when the brush 28 rested upon the insulation between strips 55 and 56 and a current would again be formed causing another impulse of the selecting device when the brush 28 bore upon the strip 55.

Further movement of the arm 9 would cause no further movements of the selector devices until the spring 28 bore upon the contact strip 49, for by the push key 82 contact between springs 67 and 72 is broken so that no further impulse will be caused by brush 28 bearing upon strips 54, 53, 52, 51 and 50. As soon as brush 30 bears upon strip 41 a circuit is formed thus: wire 60, strip 32, connector 58, strip 41, brush 30, brush 31, strip 35, wire 63, contact springs 152 and 151, wire 155, line wire 64 to and through the selectors to the different stations, returning by line wire 62, wire 156, springs 126 and 128, wire 61, strip 33, brush 29, brush 28, strip 49, connector 57, strip 34 and wire 59 to the other side of the source of current. It will be noticed that in the circuit last described the direction of current is reversed from that first used to actuate the selector devices, for in the circuit previously described the positive current flows from the transmitting key to line wire 62, but it now flows from the transmitting key to the line wire 64, thus the current supply to the line wires has been reversed in polarity, and consequently will have a different action upon the selector at the remote stations. As the arm 9 is further rotated the circuit will be made and broken until the springs pass the strip 45, after which no circuit will be formed as the springs 72 and 77 were separated by the depression of key 92. When the brush 28 again contacts with strip 32 a circuit will be formed as follows: from the positive side of the generator wire 60, strip 32, brushes 28 and 29, strip 33, wire 61, contact springs 128 and 126, wire 156 to the line wire 62 to and through the selectors at the remote stations returning by line wire 64, wire 155, contact springs 151 and 152, wire 63, contact strip 35, brushes 31 and 30, contact strip 34, wire 59 to the other side of the battery. The circuit last formed having current flowing in it in the same direction as the first circuit described, thereby the selectors are operated to cause a local contact to be closed at the particular station, whose combination is 3—5, in a manner fully shown, described and claimed in applicant's co-pending application, Serial No. 596,252, filed December 8, 1910. As soon as the local contact is closed the alternating current from one pole of the source of alternating current connected to both line wires 59 and 60 flows by wire 59 to strip 34, brush 30, brush 31, strip 35, wire 63, contact springs 152 and 151 and wire 155 to line wire 64, it also flows by means of wire 60 to strip 32, brush 28, brush 29, strip 33, wire 61, contact springs 128 and 126, wire 156 to line wire 62. The current then travels to the remote station at which the local contact was closed in a manner fully shown, described and claimed in applicant's co-pending application Serial No. 600,083 above referred to, to actuate an alarm device, returning to the alternating source of current by means of a wire from the alarm device connected to the ground, the opposite pole of the source at the central station from that to which the wires 59 and 60 are connected being also connected to the ground in order to complete the return path.

The operator continues to rotate the arm 9 until the disk 139 comes in contact with the projection 138 on the lever 137, during the entire time of which movement from the beginning of strip 32 the alarm at the remote station continues to ring. A further movement of the arm 9 causes the lever 137 to be moved in the direction indicated by arrow E in Fig. 1, which as it is rigidly connected to lever 134 causes a corresponding movement in said lever and as the lever 134 is retated it bears against fingers 132 and 133 on the sectors 104 and 105 respectively, causing the said sectors to both rotate about the shaft 8 in a direction indicated by arrow D in Fig. 1, and the fingers 132 and 133 assume the position as shown in Fig. 12, which causes the holes 103 in said sectors to aline with the circular base on the cone 97, thereby allowing the spring 170 to project the keys 82 and 92 into their normal outward position. If the operator continues to hold the thumb piece 141 depressed the lever 137 will be held at the limit of its motion in the direction of arrow E, Fig. 1 and the alarm at the remote station will continue to ring, but as soon as the operator releases the thumb piece 141 the spring 142 will project it outwardly thereby freeing the lever 137, which will return to its normal position as shown in Fig. 1 by virtue of the fact that the tension springs 124 bear on the levers 117 and 118, which in turn by means of their bifurcated ends act on the levers 115 and 116 in a direction to rotate the sectors to which the said levers are attached in the direction of the arrow F, as shown in Fig. 1. As soon as such movement is completed the springs 125 and 127 break contact, being no longer pressed together by the lever 117, and at the same time springs 126, 128, 151 and 152 break contact a consequence of which is that the relay is deënergized, the generator stops, and the line wires are disconnected from the transmitting key, it being obvious that the alarm at the remote station ceases to ring at the same moment that the contact springs shift.

It is to be observed that throughout the entire revolution of the arm 9 the gear 11 has moved with it, rotating the pinion 12 and through it the gear 13, which is in mesh with the pinion 14 bearing the friction shoes 18, so that if the operator attempts to rotate the crank arm 9 at an excessive rate of speed the shoes 18—18 are by action of centrifugal force thrown outwardly against the tension of the springs 19 and bear against the friction drum 21, so that the faster the operator attempts to turn the crank the greater the friction on the drum 21, and it can be readily understood that the tension of the springs 19 can be so adjusted as to oblige the operator to always turn the handle below a certain speed.

It should be observed that the push key 87 does not control a contact similar to 65, 66, etc., so that when it is depressed the converter is started and the maximum number of impulses is transmitted from the key in one direction. When push key 95 is depressed, the key is connected to the line and the maximum number of impulses in an opposite direction are sent.

We wish it to be understood that we do not desire to be limited to the exact details of construction shown and described, for the obvious modifications will occur to a person skilled in the art.

Having particularly described the construction of embodiment of our invention and explained the operation and principle thereof, what we claim as new and desire to protect by Letters Patent is:—

1. In a selective calling key, a normally inactive converter, a manually operable means for starting the normally inactive converter, an independently manually operable means for transmitting a number of impulses of electricity from said converter and means caused to act automatically by said second named means to return said first named means to unoperated position.

2. In a selective calling key, a normally inactive converter, a manually operable means for starting the normally inactive converter, an independently manually operable means for transmitting a number of impulses of electricity from said converter, means for governing the interval between impulses and the duration of impulses, and means caused to act automatically by said second named means to return said first named means to unoperated position.

3. In a selective calling key, a normally inactive converter, a manually operable means for starting the normally inactive converter, independently manually operable means for transmitting a number of impulses of electricity from said converter in one direction, then a number in the other direction, then one in the first said direction and means caused to act automatically by said second named means to return said first named means to unoperated position.

4. In a selective calling key, in combination, normally open contacts, means for closing the contacts, a pivoted member connected to said means for closing them, a spring pressed push key for operating said pivoted member, said push key and pivoted member having coöperating parts whereby said pivoted member prevents the return of said push key after being pushed, and said push key holds said pivoted member in a moved position, means for utilizing said contacts, and means for returning the pivoted member and the push keys to their original positions.

5. In a selective calling key, in combination, normally open contacts, means for closing the contacts, a pivoted member connected to said means for closing them, a spring pressed push key for operating said pivoted member, said push key and pivoted member having coöperating parts whereby said pivoted member prevents the return of said push key after being pushed, and said push key holds said pivoted member in a moved position, a source of current operatively connected to the key by the closing of said normally open contacts, manually operable means to transmit said current in impulses from the key, means acted upon by said last named means to cause a movement of said pivoted member for releasing said push key to allow it to return to unoperated condition.

6. In a selective calling key, manually operable means for transmitting a number of impulses of electricity in one direction, then a number in an opposite direction, then one impulse in the first said direction, means actuated by a single manual motion for predetermining the number of the first said impulses and for starting a normally inactive converter for supplying electrical energy for all the above mentioned impulses, means operable by a single manual motion for connecting said first named means with a transmission line and for predetermining the number of said impulses in an opposite direction, and means operated automatically by the first named manually operable means for returning said second and third above mentioned means to unoperated position.

7. In a selective calling key, a normally inactive converter, a manually operable means for starting the normally inactive converter, an independently manually operable means for connecting the key to a transmission line, an independently manually operable means for transmitting a number of impulses of electricity from said converter to said line and means caused to act automatically by said last named means to return both said first and said second named means to unoperated position.

8. In a selective calling key, in combination, normally open contacts connected to a starting devise, a lever for closing the contacts, a sector for moving the lever, push keys for moving the sector, a series of normally closed contacts corresponding with the keys, means connected to each of the push keys for breaking its normally closed contact, a second set of push keys, a second sector moved thereby, a second series of normally closed contacts corresponding with the second said set of push keys, a lever connected to said second sector, two sets of normally open contacts controlled thereby, connections from said contacts on one side to line wires, connections from the other side of said contacts, metallic strips connected therewith, other metallic strips, brushes adapted to contact the metallic strips, a shaft bearing the brushes, a crank for turning the shaft.

9. In a selective calling key, in combination, a source of current, an annular metallic strip having a connection with an external system, another annular strip having a connection with an external system, segmental strips connected to said source of current, other segmental strips, connections from the said source of current to each of said other strips, normally closed contacts in the connections to certain of said strips, and means to break any of said contacts at will, normally open contacts in the circuit of a starting device, normally open contacts in the connections of the annular strips to an external system, and means comprising push keys for breaking the said normally closed contacts and closing the said normally open contacts.

10. In a selective calling key, a normally inactive converter, manually operable means for starting the normally inactive converter, manually operable means for connecting the key with a transmission line, manually operable means to impress upon the line a predetermined fixed number of impulses of electricity from said converter in one direction, then a predetermined fixed number in the opposite direction, then one in the first said direction and means then caused to act automatically by the impulse impressing means to stop the started converter and disconnect the key from the transmission line.

11. In a selective calling key, manually operable means for transmitting a number of impulses of electricity, means actuated by a single manual motion for predetermining the number of the impulses and for starting a normally inactive converter for supplying electrical energy for the impulses, means operated automatically by said first named means for returning said second named means to unoperated position.

12. In a selective calling key, two pivoted members, means to rotate one of said members, means to rotate the other of said members, means constantly tending to rotate both said members to normal position, means to rotate both of said members simultaneously, said last named means when released allowing both of said members to return to normal position.

13. A calling apparatus comprising sets of selective calling keys, each key comprising a stem, an inverted cone shaped member on said stem, a finger rest on the stem, spring means to hold the stem, cone shaped member, and finger rest normally in one position, a pivoted member for each set of keys having a hole therethrough under the cone shaped member, said hole being of such a size that the cone shaped member may pass therethrough, the cone shaped member normally resting on an edge of the hole, the depression of the cone shaped member causing a rotation of its pivoted member, means acting upon the pivoted members to cause them to engage the base of the corresponding cone shaped member when the cone shaped member is depressed and prevent the return of the cone shaped member, and means including a pivoted member for moving the first mentioned pivoted members to allow their spring actuated cone shaped members to return to normal position.

MAURICE F. GEER.
RICHARD C. LEAKE.

Witnesses:
ROBINA J. HAIRE,
LILLIAN L. PHILLIPS.

---

Copies of this patent may be obtained for five cents each, by addressing the "Commissioner of Patents, Washington, D. C."